(12) United States Patent
Eberling et al.

(10) Patent No.: US 7,744,168 B2
(45) Date of Patent: Jun. 29, 2010

(54) BRAKE CONTROL SYSTEM

(75) Inventors: Charles E. Eberling, Wellington, OH (US); Ron R. Stahl, Medina, OH (US); Kenneth A. Grolle, Elyria, OH (US); William P. Amato, Avon, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 1330 days.

(21) Appl. No.: 11/221,183

(22) Filed: Sep. 7, 2005

(65) Prior Publication Data

US 2007/0052291 A1    Mar. 8, 2007

(51) Int. Cl.
    *B60T 8/26*    (2006.01)
(52) U.S. Cl. ..................... 303/192; 303/9.67
(58) Field of Classification Search ................ 303/9.62, 303/9.66, 9.69, 191–192
    See application file for complete search history.

(56) References Cited

U.S. PATENT DOCUMENTS

| | | | |
|---|---|---|---|
| 2,190,981 A * | 2/1940 | Freeman ..................... 188/353 |
| 3,606,491 A * | 9/1971 | Walsh ......................... 303/159 |
| 4,114,957 A * | 9/1978 | Eichhorst .................... 303/163 |
| 4,383,717 A * | 5/1983 | Bueler ........................... 303/7 |
| 4,453,778 A * | 6/1984 | Smith et al. ................ 303/22.7 |
| 4,591,016 A * | 5/1986 | Matthews .................... 180/165 |
| 4,865,175 A | 9/1989 | Hirako et al. |
| 5,452,946 A | 9/1995 | Warner |
| 5,957,552 A | 9/1999 | Claussen |
| 5,997,108 A | 12/1999 | Claussen et al. |
| 6,209,966 B1 * | 4/2001 | Mies ............................. 303/3 |
| 6,233,514 B1 | 5/2001 | Claussen et al. |
| 6,428,120 B1 | 8/2002 | Holl |
| 6,502,652 B2 | 1/2003 | Rogg |
| 6,591,705 B1 | 7/2003 | Reik et al. |
| 6,676,561 B2 | 1/2004 | Fritzer et al. |
| 6,814,414 B1 * | 11/2004 | Schmitt et al. ............. 303/191 |
| 7,319,927 B1 * | 1/2008 | Sun et al. ....................... 701/93 |
| 7,401,871 B2 * | 7/2008 | Lu et al. ..................... 303/147 |
| 2001/0022245 A1 | 9/2001 | Rogg |
| 2002/0084129 A1 | 7/2002 | Fritzer et al. |
| 2002/0091472 A1 | 7/2002 | Jager et al. |
| 2004/0189081 A1 | 9/2004 | Hardtle et al. |

FOREIGN PATENT DOCUMENTS

| | | |
|---|---|---|
| DE | 20117647 U1 | 1/2003 |
| EP | 0816195 A2 | 1/1998 |
| EP | 1375279 A1 | 1/2004 |
| WO | WO2004/058551 A1 | 7/2004 |

\* cited by examiner

*Primary Examiner*—Christopher P Schwartz
(74) *Attorney, Agent, or Firm*—Calfee, Halter & Griswold LLP

(57) ABSTRACT

A brake disabling device for a vehicle includes an electronic control unit (ECU) for receiving a signal indicative of a direction of the vehicle. A control device communicates with the ECU for disabling brakes associated with a steer axle of the vehicle as a function of the direction of the vehicle.

14 Claims, 3 Drawing Sheets

BRAKE CONTROL SYSTEM

BACKGROUND

The present invention relates to a brake control system. It finds particular application in conjunction with controlling brakes to assist a heavy vehicle backing down a slope and will be described with particular reference thereto. It will be appreciated, however, that the invention is also amenable to other applications.

Heavy vehicles (e.g., trucks) are frequently used in heavy industry and for construction jobs. For example, trucks are commonly used at construction sites for carrying and delivering heavy materials. It is not uncommon that a truck is required to back down a steep sloped surface (e.g., a hill having a grade of 20% to 30%) for unloading the material.

When the truck is backed down a sloped surface, weight is transferred from the front axles to the rear axles. Furthermore, when backing down the slope, the truck is typically traveling at less than about 5 miles per hour (mph). An anti-lock braking system (ABS) is typically designed to be inoperative at speeds less than about 5-6 mph. Therefore, the ABS on a truck backing down a slope likely becomes inoperative or "cuts-out." Because the ground at a construction site on which a heavy vehicle operates often times includes mud or other substances that may increase the likelihood of wheel slippage, the wheels associated with the steering axle (e.g., the front wheels) tend to lock when the service brakes are applied if the ABS cuts-out. Once the wheels associated with the steering axle lock, the driver's ability to steer the vehicle is impeded. Therefore, it is not uncommon for a driver of a truck backing down a slippery slope at a low speed (e.g., less than about 5 mph) to experience difficulty steering because the wheels associated with the steering axle lock when the service brake is applied.

One method drivers of heavy vehicles currently employ for preventing the wheels associated with the steering axle from locking while backing down a surface having a steep grade includes using the vehicle's hand brake in place of the service brakes to slow down the vehicle. More specifically, the operator does not activate the service brakes by depressing the foot pedal but, instead, activates the hand brake to control the speed of the vehicle. Since hand brakes on heavy vehicles typically only control the rear brakes, the front (steering) wheels do not lock. Therefore, the steering capacity of the vehicle is not degraded by locked wheels on the steering axles.

Although the operator has more control over steering the vehicle, there are drawbacks when using the hand brake to control the vehicle speed under the circumstances described above. For example, high hysteresis associated with use of the hand brake makes it difficult to control the speed of the vehicle. Furthermore, while operating the hand brake, one of the operator's hands cannot be used for steering the vehicle. Therefore, the operator's ability to steer the vehicle is compromised.

SUMMARY

In one aspect of the present invention, it is contemplated to disable brakes associated with a steer axle of a vehicle when the vehicle is backed down a sloped incline.

In one embodiment, a brake disabling device for a vehicle includes an electronic control unit (ECU) for receiving a signal indicative of a direction of the vehicle. A control device communicates with the ECU for disabling brakes associated with a steer axle of the vehicle as a function of the direction of the vehicle.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
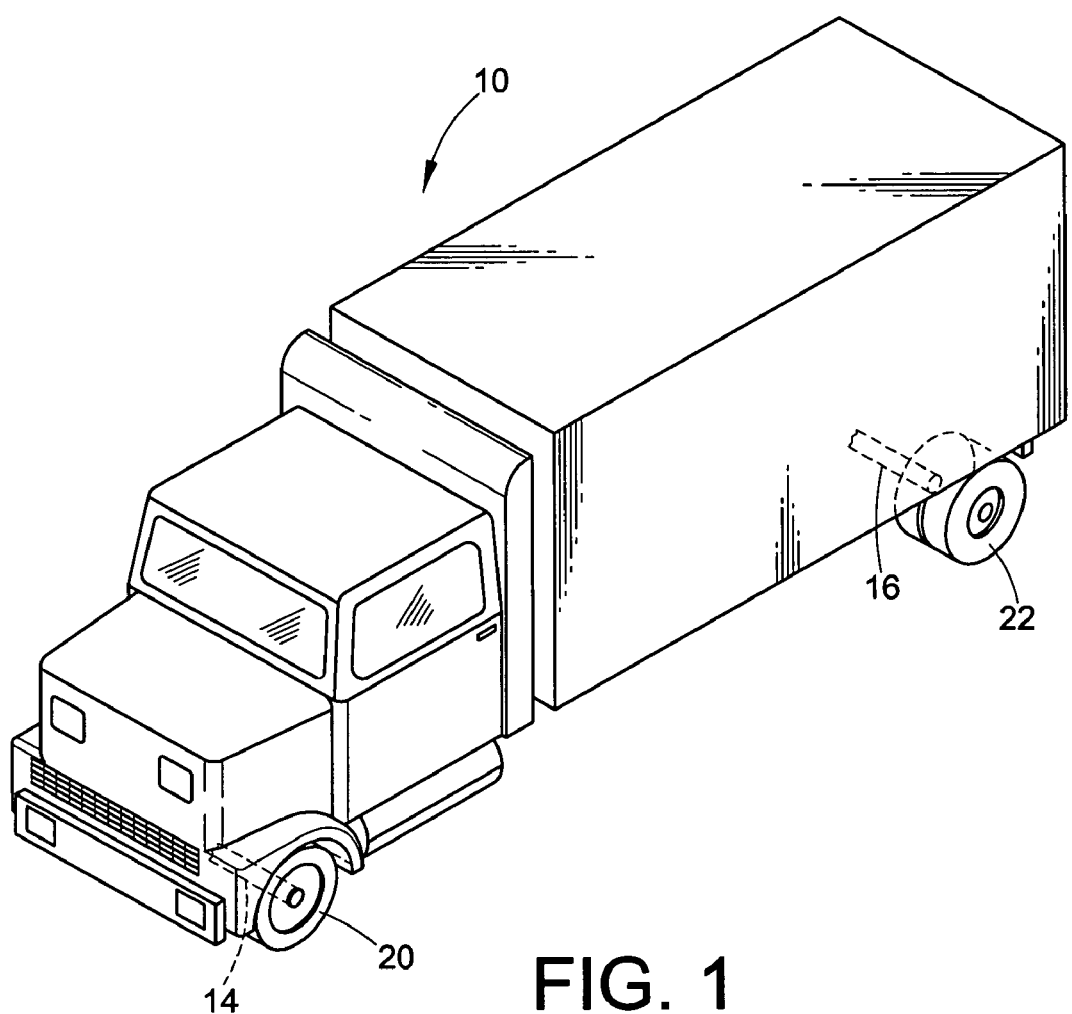
FIG. 1 illustrates a vehicle in accordance with one embodiment of the present invention.

With reference to FIG. 1, a vehicle 10 including a brake control system is illustrated in accordance with one embodiment of the present invention. In one embodiment, the vehicle is a heavy vehicle (e.g., a truck or bus). However, other embodiments including other types of vehicles are also contemplated.

Figure 2:
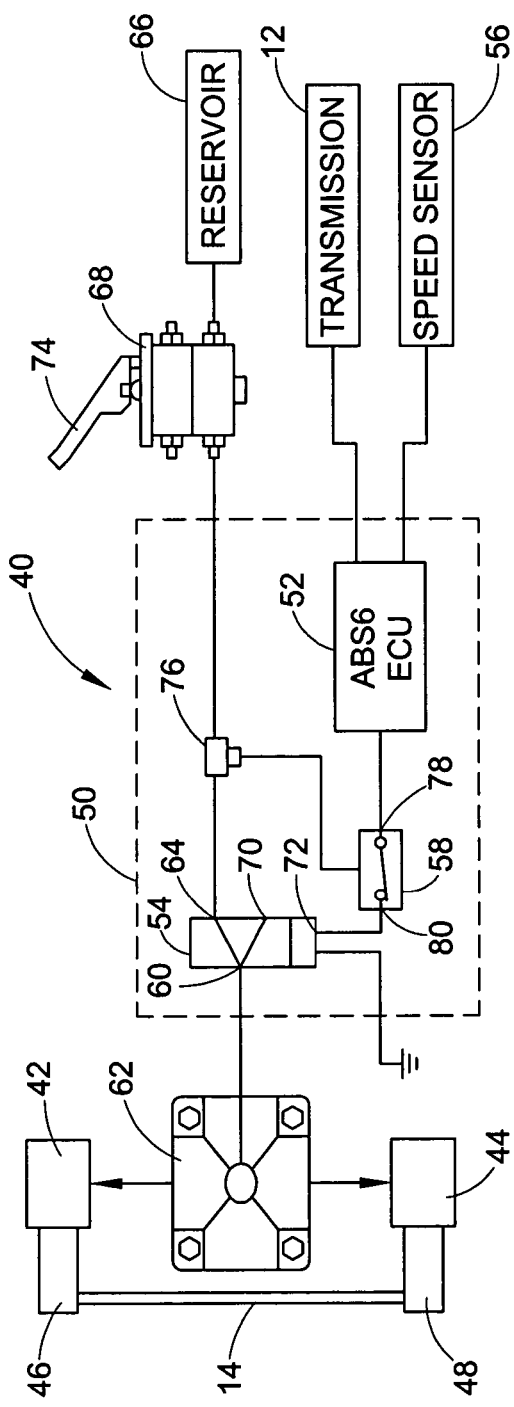
FIG. 2 illustrates a brake control device in accordance with one embodiment of the present invention.

The vehicle 10 includes a transmission 12 (see FIG. 2). In one embodiment, the transmission is an automatic transmission. However, other embodiments including a manual transmission are also contemplated. A user sets a direction of the transmission, which controls a direction of the vehicle 10, via a gear selector (not shown) in the vehicle 10.

In the illustrated embodiment, the vehicle 10 is a truck (e.g., a straight truck) including a plurality (e.g., two (2)) of axles 14, 16. One of the axles 14 is a steer axle while the other axle 16 is a non-steer axle. At least one wheel 20, 22 is associated with each of the respective axles 14, 16.

With reference to FIG. 2, an exemplary brake control system 40 is illustrated in accordance with one embodiment of the present invention. In the illustrated embodiment, the control system 40 is used to control brake chambers 42, 44 and brakes 46, 48 associated with the steer axle 14. However, it is to be understood that the control system of the present invention may also be used with brakes associated with a non-steer axle. The control system 40, which acts as a brake control device for selectively disabling the brakes 46, 48 associated with the steer axle 14 while backing the vehicle 10 (see FIG. 1), includes a control device 50 including an electronic control unit (ECU) 52 and a switch 54 for disabling the brakes 46, 48 as a function of at least one of the speed of the vehicle and the direction of the vehicle 10.

As illustrated, the ECU 52 may be associated with an antilock braking system (ABS) on the vehicle. However, other ECUs may also be used. The ECU 52 receives a signal (e.g., an electronic signal) from the transmission 12 indicating the direction of the vehicle 10. The ECU 52 also receives a signal from a speed sensor 56 indicating a speed of the vehicle. The ECU 52 determines the direction and the speed of the vehicle 10. A control signal from the ECU 52 is transmitted to the switch 54 via an override switch 58, which is also part of the control device 50 and which will be described in more detail below.

In one embodiment, the switch 54 is a solenoid (e.g., a three-way solenoid). A delivery port 60 of the solenoid 54 communicates with the brake chambers 42, 44 via a relay valve 62. A supply port 64 of the solenoid 52 receives pressurized air from a source 66 of pressurized air (e.g., a reservoir) via a service brake control valve 68. An exhaust port 70 of the solenoid 54 fluidly communicates with atmosphere. The delivery port 60 switches between fluid communication with the supply port 64 and the exhaust port 70 as a function of a control signal received at a control port 72. In one embodiment, the delivery port 60 fluidly communicates with the supply port 64 (e.g., a first mode of operation) when the control port 72 is not activated by a control signal, and the delivery port 60 fluidly communicates with the exhaust port 70 (e.g., a second mode of operation) when the control port 72 is activated by a control signal.

Lack of a control signal from the ECU 52 sets the switch 54 in the first mode of operation when either i) the ECU 52 receives a signal from at least one of the wheels 20, 22 indicating that the direction of the vehicle 10 is not reverse or ii) when the ECU 52 receives a signal from the speed sensor 56 indicating that the speed of the vehicle 10 is greater than a predetermined trigger level (e.g., greater than about 5 miles per hour (mph)). A control signal received from the ECU 52 sets the switch 54 in the second mode of operation when i) the ECU 52 receives a signal from the wheels 20, 22 indicating that the direction of the vehicle 10 is reverse and ii) when the ECU 52 receives a signal from the speed sensor 56 indicating that the speed of the vehicle 10 is less than the predetermined trigger level.

Although it is described that the ECU 52 determines the direction of the vehicle 10 as a function of a direction of at least one of the wheels 20, 22, it is to be understood that other embodiments that determine the direction of the vehicle as a function of a direction of the vehicle's transmission are also contemplated.

During the first mode of operation, pressurized air passes from the reservoir 66 to the brake chambers 42, 44 via the brake control valve 68, the switch 54, and the relay valve 62 as a function of a brake demand pressure initiated by a user operating a foot pedal 74 of the brake control valve 68. More specifically, a level of the pressurized air in the brake chambers 42, 44 corresponds to an amount the foot pedal 74 is activated. The service brakes 46, 48 are engaged as a function of the pressurized air in the brake chambers 42, 44.

During the second mode of operation, the brake chambers 42, 44 are equalized with atmospheric pressure via the relay switch 62 and the delivery and exhaust ports 60, 70, respectively, of the switch 54. More specifically, pressurized air in the brake chambers 42, 44 is exhausted via the relay valve 62 and the delivery and exhaust ports 60, 70, respectively, of the switch 54. Once the pressurized air in the brake chambers 42, 44 is exhausted the service brakes 46, 48 are disengaged or released. Therefore, during the second mode of operation, the service brakes 46, 48 are disabled. If the speed of the vehicle 10 increases above a predetermined upper hysteresis level (e.g., about 10 mph), the ECU 52 sets the switch 54 back to the first mode of operation for allowing the front brakes to operate normally again. The upper hysteresis level is chosen to allow the vehicle some range of speed (e.g., between about 5 mph and about 10 mph) once the switch 54 is set to the second mode of operation, which reduces oscillation of the switch 54 between the first and second modes of operation when such oscillation may be undesirable. Because the service brakes 46, 48 are disengaged whenever the switch 54 operates in the second mode, the service brakes 46, 48 are disabled whenever i) the vehicle 10 is reversing (backing) and ii) the ECU 52 receives a signal from the speed sensor 56 indicating that the speed of the vehicle is less than the predetermined trigger level. Furthermore, the service brakes 46, 48 remain disengaged as long as the wheels 20, 22 do not indicate the vehicle is moving forward and as long as the speed of the vehicle is less than the predetermined upper hysteresis level.

As discussed above, disabling the brakes 46, 48 associated with the steer axle 14 assists with steering when the vehicle is backed down a slope. In the illustrated embodiment, only the brakes 46, 48 associated with the steer axle 14 are disabled under certain conditions. The brakes associated with the non-steer axle 22 (see FIG. 1) are not disabled.

In one embodiment the override switch 58 is a pressure switch. The override switch 58 monitors the brake demand pressure delivered from the brake control valve 68 to the switch 54 via a connector 76 (e.g., a T-connector). The override switch 58 also includes an input port 78, which receives the control signal from the ECU 52, and an output port 80 that communicates with the control port 72 of the switch 54. In the illustrated embodiment, the pressure switch 58 is normally closed. In other words, when the brake demand pressure is below a predetermined override level (e.g., 20 psi), the pressure switch 58 is "closed" to communicate the control signal from the ECU 52 to the control port 72 of the switch 54. If the user pushes the pedal 74 of the brake control valve 68 to a position that causes the level of pressure delivered from the brake control valve 68 to the switch 54 to rise above the predetermined override level, the pressure switch "opens" to prevent the control signal from the ECU 52 from being delivered to the control port 72 of the switch 54. Because the control port 72 of the switch 54 is not activated (i.e., no control signal is received at the control port 72), the switch 54 is set to the first mode of operation so that pressurized air is delivered from the reservoir 66 to the brake chambers 42, 44 via the brake control valve 68 and the switch 54.

Because of the override switch 58, the brakes 46, 48 are not disabled when a brake demand pressure indicates the user desires the brakes 46, 48 to become operational. Therefore, the override switch 58 acts as a means for overriding the means for disabling the brakes 46, 48.

Figure 3:
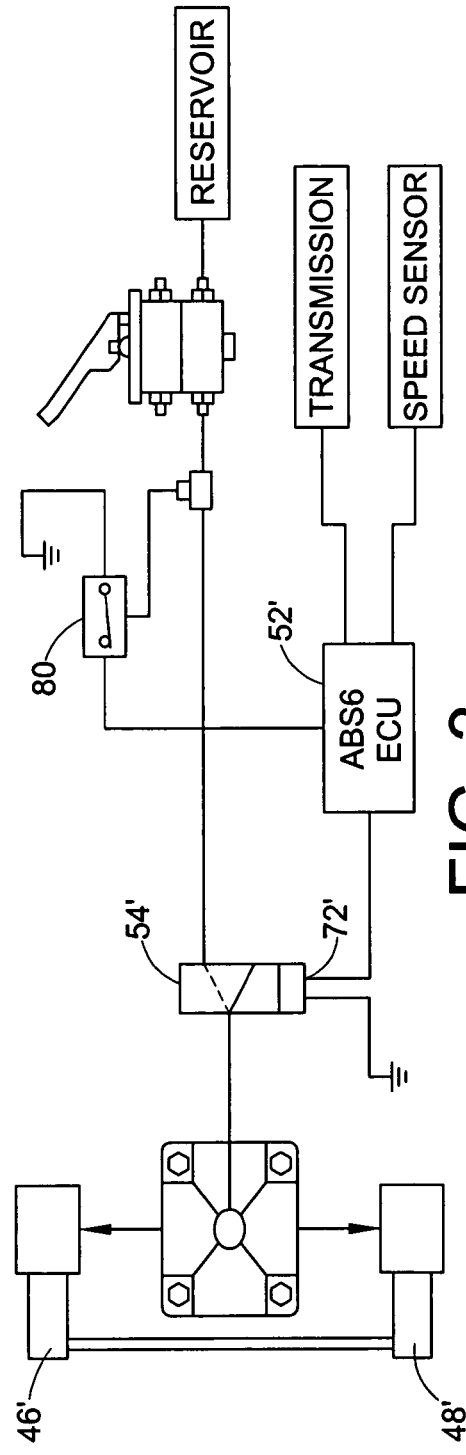
FIG. 3 illustrates a brake control device in accordance with a second embodiment of the present invention.

FIG. 3 illustrates a second embodiment of the present invention. For ease of understanding this embodiment of the present invention, like components are designated by like numerals with a primed (') suffix and new components are designated by new numerals. In this embodiment, the override switch 80 is normally "open" and includes one connection to ground and another connection to the ECU 52'. If the brake demand pressure is below the predetermined override level, the override switch 80 remains open. If the brake demand pressure is above the predetermined override level, the override switch 80 closes and a ground signal is supplied to the ECU 52'. Software in the ECU 52' recognizes the ground signal from the override switch 80 and sends a signal to the control port 72' of the switch 54' to supply pressurized air to the brakes 46', 48'. Therefore, the override switch 80 also acts as a means for overriding the means for disabling the brakes 46', 48'.

Figure 4:
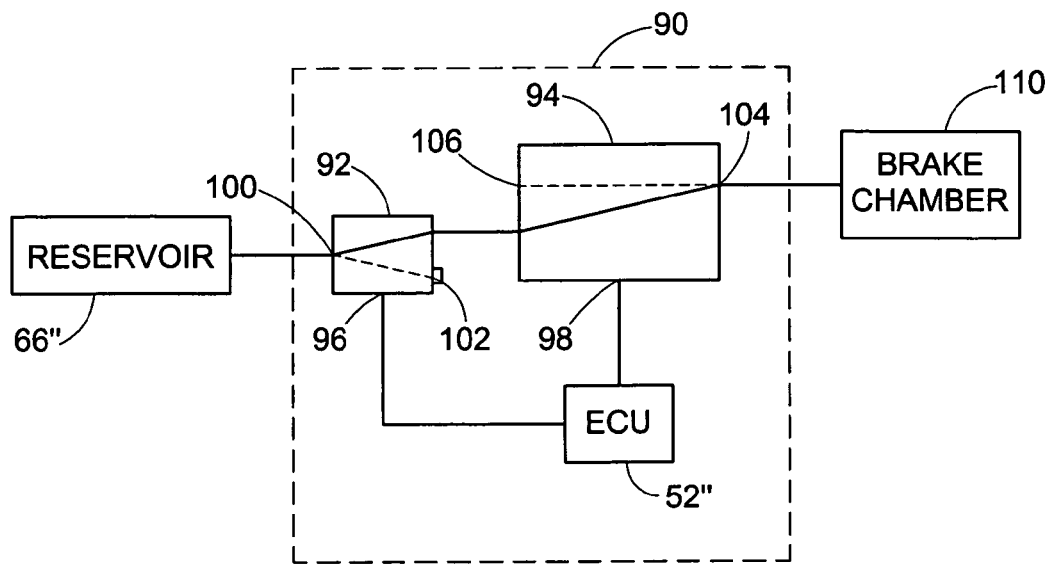
FIG. 4 illustrates a brake control device in accordance with a third embodiment of the present invention.

FIG. 4 illustrates another embodiment of the control device. For ease of understanding this embodiment of the present invention, like components are designated by like numerals with a double-primed (") suffix and new components are designated by new numerals. In this embodiment, the control device 90 includes two switches 92, 94 (e.g., solenoids), which are typically used during ABS modulation. Energizing respective control ports 96, 98 of both of the solenoids 92, 94 via control signals from the ECU 52" causes both solenoids 92, 94 to be set to an exhaust position. More specifically, the supply port 100 of the first solenoid 92 communicates with an exhaust port 102, which is capped. Because the exhaust port 102 is capped, no air from the reservoir 66" escapes. Furthermore, the delivery port 104 of the second solenoid 94 communicates with an exhaust port 106, which exhausts air from the brake chamber 110 for disabling an associated brake.

Figure 5:
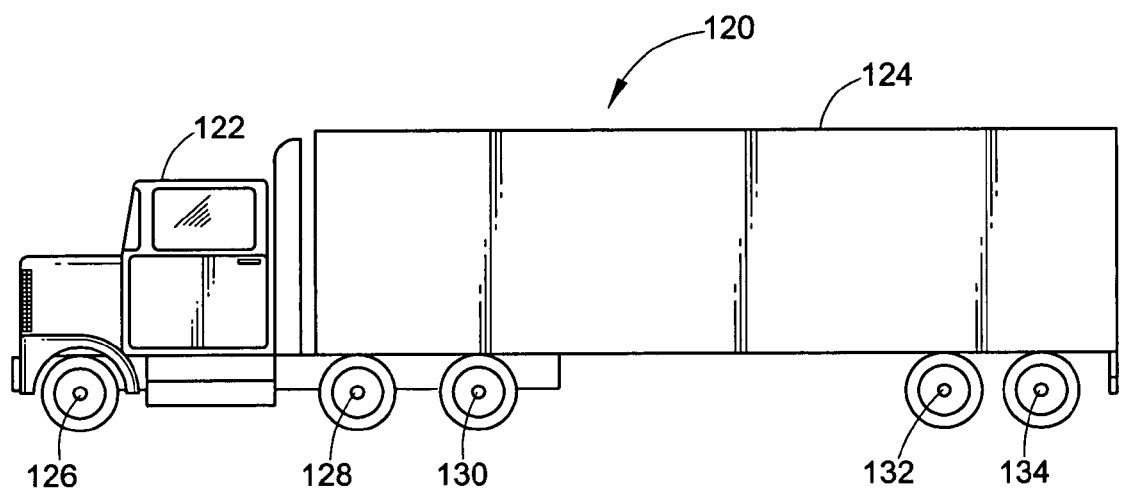
FIG. 5 illustrates a vehicle in accordance with another embodiment of the present invention.

FIG. 5 illustrates another embodiment of the present invention. In this embodiment, the vehicle 120 is an articulated truck including a tractor 122 and a trailer 124, which is secured to the tractor 122. The tractor 122 includes three (3) axles 126, 128, 130 while the trailer 124 includes two (2) axles 132, 134. One of the tractor axles 126 is a steer axle while the remaining axles 128, 130, 132, 134 are non-steer axles. As in the earlier embodiments, the brakes associated with the steer axle 126 become disabled according to the conditions discussed above.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A brake disabling device for a vehicle, comprising:
   an electronic control unit (ECU) for receiving a signal indicative of a direction of the vehicle; and
   a control device communicating with the ECU for disabling brakes associated with a steer axle of the vehicle as a function of the direction of the vehicle; wherein the control device includes:
      an electro-pneumatic switch capable of passing a pressure signal to respective brake chambers of the brakes of the steer axle as a function of the direction of the vehicle; and
      a pressure switch receiving a signal indicating a brake demand, the pressure switch communicating a first signal to the ECU when the user's brake demand is less than a predetermined level, the pressure switch communicating a second signal to the ECU when the user's brake demand is greater than a predetermined level, the ECU communicating a control signal to the electro-pneuatic switch for setting the electro-pneumatic switch to pass pressurized air to the brake chambers when the second signal is communicated to the ECU.

2. The brake disabling device as set forth in claim 1, wherein: the ECU receives a signal indicative of a speed of the vehicle; and the control device communicates with the ECU for disabling the brakes as a function of the speed and direction of the vehicle.

3. The brake disabling device as set forth in claim 1, wherein: the control device disables the brakes as a function of a brake demand pressure.

4. The brake disabling device as set forth in claim 1, wherein: the ECU receives an electronic signal from a wheel of the vehicle indicating the direction of the transmission.

5. The brake disabling device as set forth in claim 1, wherein: the electro-pneumatic switch is capable of passing pressurized air from a source of the pressurized air to the brake chambers when an electrically controlled control port of the electro-pneumatic switch is not activated; and the electro-pneumatic switch causes pressurized air in the brake chambers to be exhausted, for disabling the associated brakes, when the electrically controlled control port of the electro-pneumatic switch is activated.

6. The brake disabling device as set forth in claim 1, wherein the electro-pneumatic switch is a solenoid.

7. A brake disabling device for a vehicle comprising:
   an electronic control unit (ECU) for receiving a signal indicative of a direction of the vehicle; and
   a control device communicating with the ECU for disabling brakes associated with a steer axle of the vehicle as a function of the direction of the vehicle; wherein the control device includes:
      an electro-pneumatic switch capable of passing a pressure signal to respective brake chambers of the brakes of the steer axle as a function of the direction of the vehicle; and
      a pressure switch receiving i) a control signal from the ECU as a function of the direction of the vehicle and ii) a signal indicating a brake demand, the pressure switch communicating the control signal from the ECU to the electro-pneumatic switch for causing the electro-pneumatic switch to equalize a pressure in the brake chamber with atmosphere when the brake demand is less than a predetermined level and for causing the electro-pneumatic switch to pass the pressure signal to the brake chambers when the brake demand is above the predetermined level.

8. A brake control system for a heavy vehicle comprising:
   an electronic control unit (ECU) determining a direction of the vehicle; and
   means for disabling brakes associated with a steer axle of the vehicle as a function of the direction of the vehicle, wherein the means for disabling includes: an electro-pneumatic switch communicating with the ECU, the electro-pneumatic switch being set to one of i) supplying pressurized air to brake chambers of respective brakes associated with a steer axle and ii) equalizing the brake chambers with atmosphere to disable the brakes.

9. The brake control system as set forth in claim 8, wherein: the electro-pneumatic switch is set to supply pressurized air to the brake chambers when at least one of i) the vehicle speed is greater than a first predetermined speed and ii) the direction of the vehicle is not reverse; and the electro-pneumatic switch is set to exhaust the pressurized air from the brake chambers when the vehicle speed is less than the first predetermined speed and the direction of the vehicle is reverse.

10. The brake control system as set forth in claim 9, wherein the electro-pneumatic switch is set to supply the pressurized air to the brake chambers when both i) the vehicle speed is greater than a second predetermined speed, which is greater than the first predetermined speed and ii) the direction of the vehicle is not reverse.

11. The brake control system as set forth in claim 10, wherein: the first predetermined speed is about 5 mph; and the second predetermined speed is about 10 mph.

12. The brake control system as set forth in claim 8, wherein: the means for disabling also disables the brakes as a function of a brake demand pressure.

13. The brake control system as set forth in claim 12, wherein the means for disabling the brakes as a function of the brake demand pressure includes: a pressure switch receiving the brake demand pressure, the pressure switch transmitting an override signal to the means for disabling if the brake demand pressure is above a predetermined level.

14. The brake control system as set forth in claim 8, wherein: the ECU also determines a speed of the vehicle; and the means for disabling also disables the brakes as a function of a speed of the vehicle.

* * * * *